US011272383B2

United States Patent
Arkko

(10) Patent No.: US 11,272,383 B2
(45) Date of Patent: Mar. 8, 2022

(54) METHOD AND APPARATUS FOR HANDLING A CRITICAL APPLICATION

(71) Applicant: Telefonaktiebolaget LM Ericsson (publ), Stockholm (SE)

(72) Inventor: Jari Arkko, Kauniainen (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/965,451

(22) PCT Filed: Mar. 9, 2018

(86) PCT No.: PCT/SE2018/050227
§ 371 (c)(1),
(2) Date: Jul. 28, 2020

(87) PCT Pub. No.: WO2019/172815
PCT Pub. Date: Sep. 12, 2019

(65) Prior Publication Data
US 2021/0058801 A1 Feb. 25, 2021

(51) Int. Cl.
*G06F 15/173* (2006.01)
*H04W 24/02* (2009.01)
(Continued)

(52) U.S. Cl.
CPC ......... *H04W 24/02* (2013.01); *H04L 43/0811* (2013.01); *H04L 69/329* (2013.01); *H04W 24/04* (2013.01)

(58) Field of Classification Search
CPC ..... H04W 24/02; H04W 24/04; H04W 36/14; H04L 43/0811; H04L 69/329
See application file for complete search history.

(56) References Cited

U.S. PATENT DOCUMENTS 7,210,147 B1 * 4/2007 Hipp ................... H04L 12/4641
718/1
8,909,766 B1 12/2014 Hegg et al.
(Continued)

OTHER PUBLICATIONS

International Search Report and Written Opinion of the International Searching Authority for PCT International Application No. PCT/SE2018/050227 dated Jan. 21, 2019.
(Continued)

*Primary Examiner* — John B Walsh
(74) *Attorney, Agent, or Firm* — Sage Patent Group

(57) ABSTRACT

A critical application system includes a wireless device, an application and a network device. The network device is configured to: receive a command from the at least one wireless device through a first application protocol interface; monitor the connection to the at least one wireless device; determine whether a change in connectivity through the connection occurs, and if so, send information regarding the change in connectivity to the application device through a second application protocol interface. The application device controller is configured to: receive information regarding a change in connectivity to at least one of the at least one wireless device through the second application protocol interface, and determine an action to take; and send a command to at least one of the at least one wireless device through a third application protocol interface, where the controller is configured to: receive the command and execute the associated action.

14 Claims, 3 Drawing Sheets

(51) Int. Cl.
*H04L 43/0811* (2022.01)
*H04L 69/329* (2022.01)
*H04W 24/04* (2009.01)

(56) References Cited

U.S. PATENT DOCUMENTS

| | | |
|---|---|---|
| 2007/0002833 A1* | 1/2007 | Bajic .................. H04L 29/1282 370/352 |
| 2010/0082810 A1 | 4/2010 | Patel et al. |
| 2011/0158653 A1* | 6/2011 | Mazed ................ H04J 14/0256 398/140 |
| 2015/0245409 A1 | 8/2015 | Medapalli |
| 2017/0255339 A1 | 9/2017 | Grover et al. |
| 2017/0359272 A1 | 12/2017 | Srinivasan et al. |

OTHER PUBLICATIONS

Vladimir Poulkov, "The Unified Wireless Smart Access for Smart Cities in the Context of a Cyber Physical System," 2017 Global Wireless Summit (GWS), published Oct. 15, 2017, 5 pages.
European Search Report and Opinion for European Patent Application No. 18908660.6 dated Feb. 19, 2021.

\* cited by examiner

US 11,272,383 B2

METHOD AND APPARATUS FOR HANDLING A CRITICAL APPLICATION

CROSS REFERENCE TO RELATED APPLICATION

This application is a 35 U.S.C. § 371 national stage application of PCT International Application No. PCT/SE2018/050227, filed on Mar. 9, 2018, the disclosure and content of which is incorporated herein by reference in its entirety.

TECHNICAL FIELD

Embodiments of the present disclosure generally relate to a method, a software module and a device for handling a critical application.

BACKGROUND

One of the key application areas in 5G is "Critical Systems", meaning systems where it is essential that high reliability and low latency of communications is retained. For instance, the 5G service requirements document in 3GPP [1] lists mission critical applications as a key area where 5G must provide solutions. It outlines hard reliability and latency requirements for these applications.

There is a lot of interest on this, but less concrete technology that can be applied. The 5G radio solutions as such are of course much better and more capable in providing both reliability and efficient, low-latency communications than previous designs. This is primarily achieved with the concept of massive MIMO and beam-forming.

For the purposes of this invention, the radio details don't matter, but it suffices to observe that the system can use multiple different, directed radio beams to communicate with a device. The system is to at least some extent aware of the suitability and availability of different beams, and the quality of communications that can be achieved through them.

Nevertheless, there are no absolute guarantees in the world of wireless communication. Systems need to be engineered to withstand changes in their communications environment.

Prior art systems for handling—as in executing—critical applications consist of a number of devices connected by a communications network (such as a mobile network), a set of other components (e.g., those in fixed networks), and central logic that runs in servers hosting the critical application.

The critical application system involves communication between all parts (perhaps via the central server), and making decisions relevant for the application, based on application level information but potentially also based on communications connectivity information. Connectivity is primarily inferred by indirect means, e.g., lack of reaching some devices. The application system may also get status information from the mobile network, if such status information is available.

One problem that has been realized by the inventors—after insightful and inventive reasoning—is that despite the best efforts in great radio designs, there is fundamentally no way around connectivity problems in some cases. That's fine, critical applications must be built in a way that loss of (some) connectivity in the overall system should not endanger the entire application or lead to real-world consequences.

Application systems do have and do get information about connectivity situation. But that is to a large extent based on indirect observation, such timeouts or the lack of messages at an agreed time. Some components have also more direct information. For instance, UE radio components know about the status and quality of radio links it is currently using.

And the radio network has made its own measurements about the radio links as well, as well as getting further information from reports sent by the UE. However, the application system is typically unaware of these more direct pieces of information for the following reasons:

Insufficient APIs in UEs to pass locally available information to applications.

Lack of understanding in UEs about what measurements mean, as they are made for network's benefit, and do not reveal the full situation.

The mobile network does not provide indications about connectivity situation or fluctuations thereof to the application (in the UE or elsewhere in the Internet)

And last but not least, if communications have broken down, the UE whose communications have broken down is unable to inform any other devices about this.

SUMMARY

The present disclosure relates to mechanisms that address at least some of the problems and issues described above.

Especially, in order to overcome connectivity problems in some cases in an optimal fashion, it would be beneficial to be able to build the application with the best knowledge of what is going on with the connectivity. This does not exist today for mobile networks, at least not in a way that would allow applications outside the mobile network to take advantage of it.

According to one aspect there is provided a critical application system comprising at least one wireless device comprising a controller, a memory and a communication interface and an application device comprising a controller, a memory and a communication interface, the at least one wireless device and the at least one application device being configured to execute a critical application utilizing a connection to a communication network, the critical application system further comprising a software module comprising computer-readable instructions being associated with the critical application, and wherein the communication network comprises a network device, the network device comprising a controller and a memory, the network device being configured to receive the software module from the critical application system and to execute the software module, thereby being configured to: receive a command from the at least one wireless device through a first application protocol interface; monitor the connection to the at least one wireless device; determine whether a change in connectivity through the connection occurs, and if so, send information regarding the change in connectivity to the application device through a second application protocol interface, wherein the controller of the application device is configured to: receive information regarding a change in connectivity to at least one of the at least one wireless device through the second application protocol interface, and in response thereto determine an action to take; and send a command associated with the action to at least one of the at least one wireless device through a third application protocol interface, wherein the controller of the at least one wireless device is configured to: receive the command and execute the associated action.

In one embodiment at least one or all of the application protocol interfaces is implemented as a web application interface.

In one embodiment at least one or all of the application protocol interfaces is implemented as a non-access stratum protocol.

In one embodiment the computer-readable instructions of the software module comprises computer-readable instructions that when loaded into and executed by a controller, causes the controller to execute the software module as a standalone device having an Internet Protocol address.

In one embodiment the computer-readable instructions of the software module comprises computer-readable instructions that when loaded into and executed by a controller, causes the controller to monitor the connectivity by receiving information regarding the connection from network controllers.

In one embodiment the connection between the at least one wireless device and the network is a wireless multiple beam connection.

In one embodiment the change in connectivity includes a change in the number of beam connections in the wireless connection, loss of connectivity, reduced redundancy in the connection and/or change in bandwidth.

In one embodiment the network device is a network server.

In one embodiment the network device is a base station.

In one embodiment the first application protocol interface comprises at least one of the instructions of the instruction set comprising {start tracking a wireless device's connectivity, stop tracking a wireless device's connectivity}.

In one embodiment the application device is configured to, upon receiving information on the change in connectivity: determine that the other of the at least one wireless device should take action, and sending information to the other of the at least one wireless device accordingly, causing the other of the at least one wireless device to perform such action; determine that a failsafe operation should be initiated, and sending information to the other of the at least one wireless device accordingly, causing the other of the at least one wireless device to initiate such failsafe operation; determine that critical data residing in the at least one wireless device experiencing the change in connectivity should be moved, and sending information to the at least one wireless device accordingly, causing the at least one wireless device to move such data; and/or determine that a change of connection should be performed, and sending information to the at least one wireless device accordingly, causing the at least one wireless device to change the connection.

According to a second aspect there is provided a method for operating a critical application system comprising at least one wireless device and an application device, the at least one wireless device and the at least one application device executing a critical application utilizing a connection to a communication network, the critical application system further comprising a software module being associated with the critical application, and wherein the communication network comprises a network device, the method comprising in the network device receiving the software module from the critical application system and executing the software module, thereby: receiving a command from the at least one wireless device through a first application protocol interface; monitoring the connection to the at least one wireless device; determining whether a change in connectivity through the connection occurs, and if so, sending information regarding the change in connectivity to the application device through a second application protocol interface, wherein the method further comprises in the application device: receiving information regarding a change in connectivity to at least one of the at least one wireless device through the second application protocol interface, and in response thereto determining an action to take; and sending a command associated with the action to at least one of the at least one wireless device through a third application protocol interface, wherein the method further comprises in the at least one wireless device: receiving the command and executing the associated action.

According to a third aspect there is provided an application device arranged to be used in a critical application system comprising at least one wireless device and said application device, the application device being configured to execute a critical application utilizing a connection to a communication network, the application device comprising a controller, a memory and a communication interface, the controller being configured to receive information regarding a change in connectivity to at least one of the at least one wireless device through a second application protocol interface from a software module comprising computer-readable instructions being associated with the critical application, and in response thereto determine an action to take; and send a command associated with the action to at least one of the at least one wireless device through a third application protocol interface, prompting the at least one wireless device to execute the associated action.

According to a fourth aspect there is provided a software module comprising computer-readable instructions being associated with a critical application, the software module being arranged to be executed by a network device comprised in a critical application system further comprising at least one wireless device and an application device, the at least one wireless device and the at least one application device being configured to execute a critical application utilizing a connection to a communication network, the computer-readable instructions thereby enabling the network device to receive a command from the at least one wireless device through a first application protocol interface; monitor the connection a to the at least one wireless device; determine whether a change in connectivity through the connection occurs, and if so, send information regarding the change in connectivity to the application device through a second application protocol interface, thereby prompting the application device: determine an action to take; and send a command associated with the action to at least one of the at least one wireless device through a third application protocol interface, thereby prompting the at least one wireless device to: execute the associated action.

According to another aspect there is provided a computer readable storage medium encoded with a software module according to above.

According to another aspect there is provided a wireless device comprising a controller, a memory and a communication interface, said wireless device being arranged to be used in a critical application system comprising the wireless device and an application device, the at least one wireless device and the at least one application device being configured to execute a critical application utilizing a connection to a communication network, the critical application system further comprising a software module comprising computer-readable instructions being associated with the critical application, and wherein the communication network comprises a network device, the network device comprising a controller and a memory, the network device being configured to receive and execute the software module, the controller of the wireless device being configured to: sending a command to the software module through a first application protocol interface; prompting the software module to monitor the connection to the at least one wireless device; determine whether a change in connectivity through the connection occurs, and if so, send information regarding the change in connectivity to the application device through a second application protocol interface, thereby prompting the controller of the application device to: determine an action to take; and send a command associated with the action to at least one wireless device through a third application protocol interface, wherein the controller of the at least one wireless device is configured to: receive the command and execute the associated action.

According to another aspect there is provided a method for use in an application device arranged to be used in a critical application system comprising at least one wireless device and said application device, the application device being configured to execute a critical application utilizing a connection to a communication network, the method comprising: receiving information regarding a change in connectivity to at least one of the at least one wireless device through a second application protocol interface from a software module comprising computer-readable instructions being associated with the critical application, and in response thereto determining an action to take; and sending a command associated with the action to at least one of the at least one wireless device through a third application protocol interface, prompting the at least one wireless device to execute the associated action.

According to another aspect there is provided a method for use in a software module being associated with a critical application, the software module being arranged to be executed by a network device comprised in a critical application system further comprising at least one wireless device and an application device, the method comprising: receiving a command from the at least one wireless device through a first application protocol interface; monitoring the at least one wireless device; determining whether a change in connectivity through the connection occurs, and if so, sending information regarding the change in connectivity to the application device through a second application protocol interface, thereby prompting the application device to: determine an action to take; and send a command associated with the action to at least one of the at least one wireless device through a third application protocol interface, thereby prompting the at least one wireless device to execute the associated action.

According to another aspect there is provided a method for use in a wireless device (being arranged to be used in a critical application system comprising the wireless device and an application device, the at least one wireless device and the at least one application device being configured to execute a critical application utilizing a connection to a communication network, the critical application system further comprising a software module comprising computer-readable instructions being associated with the critical application, and wherein the communication network comprises a network device being configured to receive and execute the software module, the method comprising: sending a command to the software module through a first application protocol interface; prompting the software module to monitor the connection to the at least one wireless device; determine whether a change in connectivity through the connection occurs, and if so, send information regarding the change in connectivity to the application device through a second application protocol interface, thereby prompting the controller of the application device to: determine an action to take; and send a command associated with the action to at least one wireless device through a third application protocol interface, wherein the method comprises: receiving the command and executing the associated action.

According to another aspect there is provided a computer readable storage medium encoded with instructions that, when executed on a processor, perform a method according to herein.

BRIEF DESCRIPTION OF THE DRAWINGS

These and other aspects, features and advantages will be apparent and elucidated from the following description of embodiments, reference being made to the accompanying drawings, in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
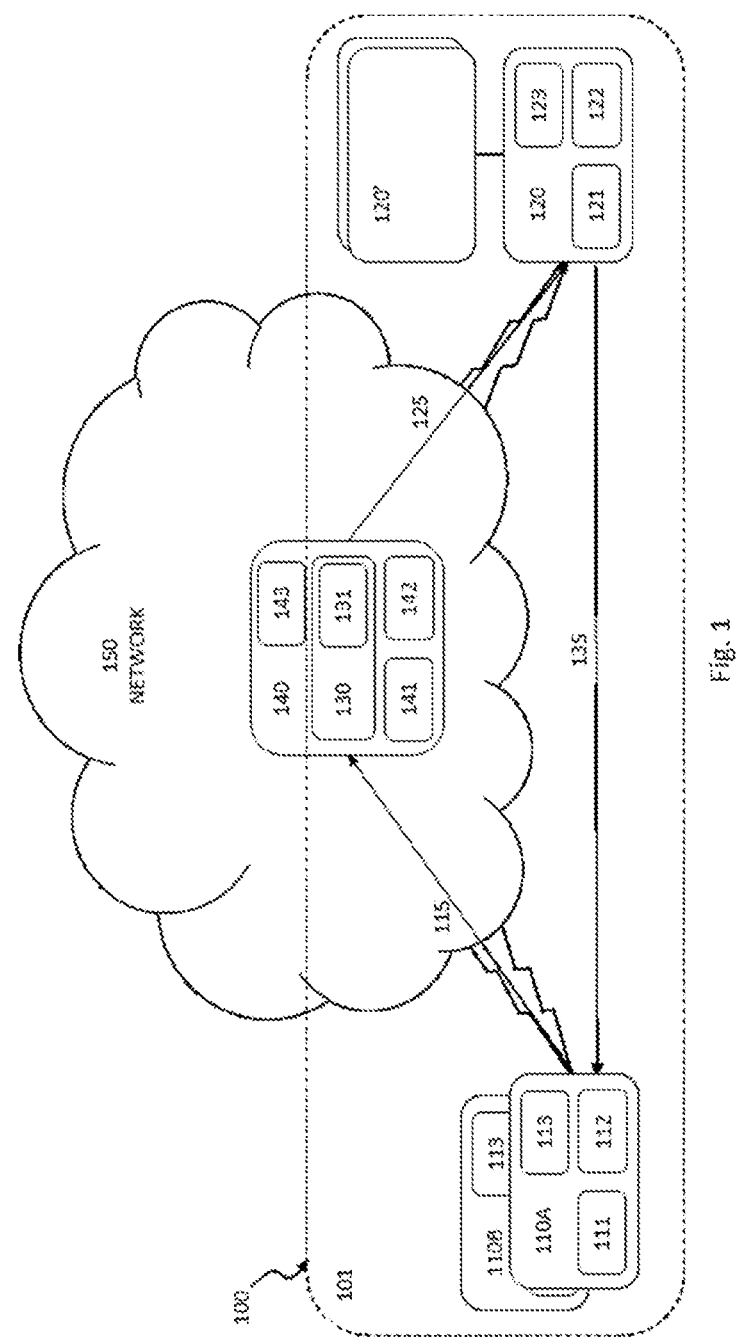
FIG. 1 is a schematic view of a critical application system according to one embodiment of the teachings herein.

FIG. 1 shows a schematic view of a system 100 enabled to handle—as in execute—a critical application 101 according to the teachings herein. The critical application system 100 comprises at least one wireless device or user equipment (UE) 110. In FIG. 1 there are two UEs shown, a first UE 110A and a second UE 110B. Examples of UEs are application specific devices, such as sensors and actuators.

Figure 2:
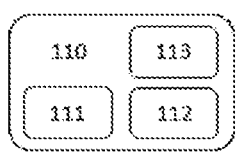
FIG. 2 is a schematic view of a user equipment according to one embodiment of the teachings herein.

FIG. 2 shows a schematic view of a User Equipment (UE) 110. The UE 110 comprises a processor arrangement 111 operably connected to a memory 112 and an interface 113. The processor arrangement 111 is configured to control the overall functionality and also specific functions of the UE 110 such as by executing computer program instructions loaded into or stored on the memory 112 connected to or being part of the processor arrangement 111. The processor arrangement 111 may comprise one or more processors or other logic programmable circuits for combined or individual execution of a task or application, such as at least parts of the critical application 101. However, for the purpose of this application they will be seen as being the one and same processor arrangement 111. The processor arrangement 111 is connected to or comprising the memory 112 for storing computer instructions and also data to be processed by the computer instructions when executed by the processor arrangement 111. The memory 112 may comprise one or several memory circuits, possibly arranged in a hierarchy. One or more of such memory circuits may be comprised in the processor arrangement 111. For the purpose of this application the memory circuits will be regarded as one memory 112. The interface 113 may comprise a wired interface such as an Ethernet cable or a USB plug (Universal Serial Bus). Alternatively or additionally the interface 113 may comprise a wireless interface, such as a Radio Frequency interface arranged to communicate according to one or several communication standards, such as a long range standard such as a cellular network standard GSM, LTE or a 5G standard, and/or a short range standard, such as a Bluetooth®, IEEE802.11b (WiFi™), IEEEE802.16, Zig-Bee™, WirelessHART (based on IEEE 802.15.4), ISA100.11a (based on IEEE 802.15.4) or NFC™ (Near Field Communication) standard. The interface 113 enables the UE 110 to communicate with other devices, possibly through a network (not shown in FIG. 2, but referenced 150 in FIG. 1) and/or through a device-to-device connection.

Returning to FIG. 1, the critical application system 100 also comprises at least one application device 120. An application device 120 is a device arranged for a specific application-related function. Examples of such application devices are application servers.

Figure 3:
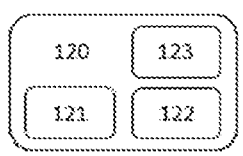
FIG. 3 is a schematic view of an application device according to one embodiment of the teachings herein.

FIG. 3 shows a schematic view of an application device (AD) 120. The AD 120 comprises a processor arrangement 121 operably connected to a memory 122 and an interface 123. The processor arrangement 121 is configured to control the overall functionality and also specific functions of the AD 120 such as by executing computer program instructions loaded into or stored on the memory 122 connected to or being part of the processor arrangement 121. The processor arrangement 121 may comprise one or more processors or other logic programmable circuits for combined or individual execution of a task or application, such as at least parts of the critical application 101. However, for the purpose of this application they will be seen as being the one and same processor arrangement 121. The processor arrangement 121 is connected to or comprising the memory 122 for storing computer instructions and also data to be processed by the computer instructions when executed by the processor arrangement 121. The memory 122 may comprise one or several memory circuits, possibly arranged in a hierarchy. One or more of such memory circuits may be comprised in the processor arrangement 121. For the purpose of this application the memory circuits will be regarded as one memory 122. The interface 123 may comprise a wired interface such as an Ethernet cable or a USB plug (Universal Serial Bus). Alternatively or additionally the interface 123 may comprise a wireless interface, such as a Radio Frequency interface arranged to communicate according to one or several communication standards, such as a long range standard such as a cellular network standard GSM, LTE or a 5G standard, and/or a short range standard, such as a Bluetooth®, IEEE802.11b (WiFi™), IEEEE802.16, Zig-Bee™, WirelessHART (based on IEEE 802.15.4), ISA100.11a (based on IEEE 802.15.4) or NFC™ (Near Field Communication) standard. The interface 123 enables the AD 120 to communicate with other devices, such as the UE 110, possibly through a network (not shown in FIG. 3, but referenced 150 in FIG. 1) and/or through a device-to-device connection.

Figure 4:
FIG. 4 is a schematic view of a computer software module according to one embodiment of the teachings herein.

Returning to FIG. 1, the critical application system 100 also comprises at least one software module 130 associated with the critical application 101. As can be seen in FIG. 4, showing a schematic view of a software module 130, the software module 130 comprises computer-readable instructions 131 that when loaded into a processor arrangement execute instructions relevant to the critical application 101. The software module 130 may be executed in the UE 110. Alternatively or additionally, the software module 130 may be executed in the application device 120. As shown in FIG. 1, the software module 130 may be executed in a network device (ND) 140.

Figure 5:
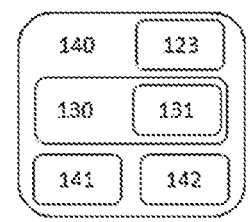
FIG. 5 is a schematic view of a network device according to one embodiment of the teachings herein.

FIG. 5 shows a schematic view of a network device 140 configured to execute a software module 130. The ND 140 comprises a processor arrangement 141 operably connected to a memory 142 and an interface 143. The processor arrangement 141 is configured to control the overall functionality and also specific functions of the ND 140 such as by executing computer program instructions loaded into or stored on the memory 142 connected to or being part of the processor arrangement 141. The processor arrangement 141 may comprise one or more processors or other logic programmable circuits for combined or individual execution of a task or application, such as at least parts of the critical application 101. However, for the purpose of this application they will be seen as being the one and same processor arrangement 141. The processor arrangement 141 is connected to or comprising the memory 142 for storing computer instructions and also data to be processed by the computer instructions when executed by the processor arrangement 141. The memory 142 may comprise one or several memory circuits, possibly arranged in a hierarchy. One or more of such memory circuits may be comprised in the processor arrangement 141. For the purpose of this application the memory circuits will be regarded as one memory 142. The interface 143 may comprise a wired interface such as an Ethernet cable or a USB plug (Universal Serial Bus). Alternatively or additionally the interface 143 may comprise a wireless interface, such as a Radio Frequency interface arranged to communicate according to one or several communication standards, such as a long range standard such as a cellular network standard GSM, LTE or a 5G standard, and/or a short range standard, such as a Bluetooth®, IEEE802.11b (WiFi™) IEEEE802.16, Zig-Bee™, WirelessHART (based on IEEE 802.15.4), ISA100.11a (based on IEEE 802.15.4) or NFC™ (Near Field Communication) standard. The interface 143 enables the ND 140 to communicate with other devices, through the network (not shown in FIG. 5, but referenced 150 in FIG. 1). In one embodiment the network device 140 is a network server. In one embodiment the network device 140 is a base station.

In one preferred embodiment the network 150 is a mobile network, also referred to as a Radio Access Network (RAN).

The proposed solution involves the UE 110, the mobile network 150, an agent of the application in the mobile network 150, i.e. the software module 130, through which the critical application 101 is enabled to stay in sync about what is happening with a connection needed for the critical application.

Specifically, the mobile network 150 is arranged to offer one agent 130 (software module) for each UE 110 in the network 150, and the agent 130 shall be arranged to receive information on connectivity changes (such as degraded redundancy situation, complete loss of connectivity, and/or available RTT and bandwidth) directly from the network as it measures the situation. The agent can then work together with the rest of the critical application system in taking corrective or failsafe action as soon as possible, without waiting for connectivity timeouts or other inferior mechanisms. This arrangement is depicted in FIG. 2.

The agent 130 can be, for instance, a piece of code (Java, Javascript) executed when something happens. In one embodiment the agent 130 may be a freestanding entity from a communications point of view, has its own IP address, and can communicate to the rest of the application in the manner it chooses. In another embodiment, the agent 130 may be of a more constrained model, where the critical application's external operations form a limited set offered by APIs (Application Programming Interface) of the agent 130 For instance, the ability to invoke a REST operation over HTTP(S). Once direct feedback about connectivity becomes available from the RAN to the agent 130, and that feedback can be acted on, the critical application 101 could track the status of connectivity, and, if it is determined that a change has happened, the agent 130 may take necessary corrective action, such as:

determine that other parts in the system need to take over the responsibilities of a device that has degraded communications means or whose communications are not available at all. For instance, if one self-driving car's communication device is not reachable, cars in front and back of this car can be informed that they need to track the unreachable car's position by other means, such as radar.

decide that a failsafe action is needed, e.g., in a traffic light system, turn all traffic lights to blinking yellow (or even red). Or in a self-driving car system, request all cars in an area to slow down or stop until communications with all cars can be re-established.

move critical data away from the device, as long as some connectivity remains.

request the UE to employ an alternate communications channel (where available).

or any other action that is sensible for the application in question. The point of a programmable agent system is that applications can decide what actions to take.

As is can be seen in FIG. 1, the application component running in a UE 110 is configured to have a first API 115 to the mobile network 150 that allows the UE 110 to control whether some kind of monitoring or agent functionality is needed in the network 150. Such a first API 115 could be implemented in many different ways. For instance, as new functionality in the NAS (Non-Access Stratum) protocol. Or, the first API 115 could be a service that the UE 110 can access over the Internet such as a web API.

The functionality of the first API 115 may be more important the details of how it is implemented. In one embodiment the functionality comprises the following exemplary commands:

Request the network 150 to track the UE's (and/or AD's) connectivity by performing actions upon specified events (e.g., loss of connectivity, reestablishment of connectivity, or change in connectivity parameters such as loss of redundancy in the ability to communicate with the device over several radio beams).

Request the network to stop tracking the device's connectivity.

The possible actions that the network 150 may be requested to perform fall under several categories, such as:

Request a REST operation to be performed over a web API when specified event happens. E.g., the mobile network could be requested to perform a HTTP POST operation on a given URL, and to include the affected device identity and event details in this transaction. The operation would be received at the application system, and then acted upon.

Request a given piece of software code to be executed. The software (perhaps written in, e.g., Java or Javascript) can then perform actions and algorithms it is free to decide itself. It needs to have a means to communicate with the application, however, perhaps through the web. For this communication a second API (referenced 125 in FIG. 1) is needed.

Request a given piece of software to run continuously, and it to receive the specified events over a third API (referenced 135 in FIG. 1). In one embodiment the first application protocol interface 115 comprises at least one of the instructions of the instruction set comprising {start tracking a wireless device's connectivity, stop tracking a wireless device's connectivity}.

In one embodiment the software module 130 may also be configured for interaction with the network device 140. Through this interaction, the network device 140 may be configured to inform the software module 130 once the network device 140 learns that there's some issue with the connection. The software module 130 will then inform the application device 120 accordingly.

In one embodiment, the software module 130 may be implemented as a URI (Uniform Resource Identifier) to call/execute/retrieve when a change has been detected.

In one embodiment at least parts of a critical application 101 run in the cloud, and the rationale for this invention is to have the mobile network be able to send information to those parts, even when particular devices are belonging to the application are out of reach.

A core aspect of the present invention is an interface that allows the UE 110 to setup an agent in the mobile network 150 with executable code, i.e. the agent 130, wherein the agent 130 is configured to receive real-time status information about the connectivity to the UE 110 via a first defined API 115 to the agent 130, whereby the agent 130 being configured for taking action based on status; communicating to an application 120 outside the UE 110, using defined second API 125.

In one such embodiment, the real-time status information comprises how many redundant radio beams are available for communication with the UE 110.

Figure 6:
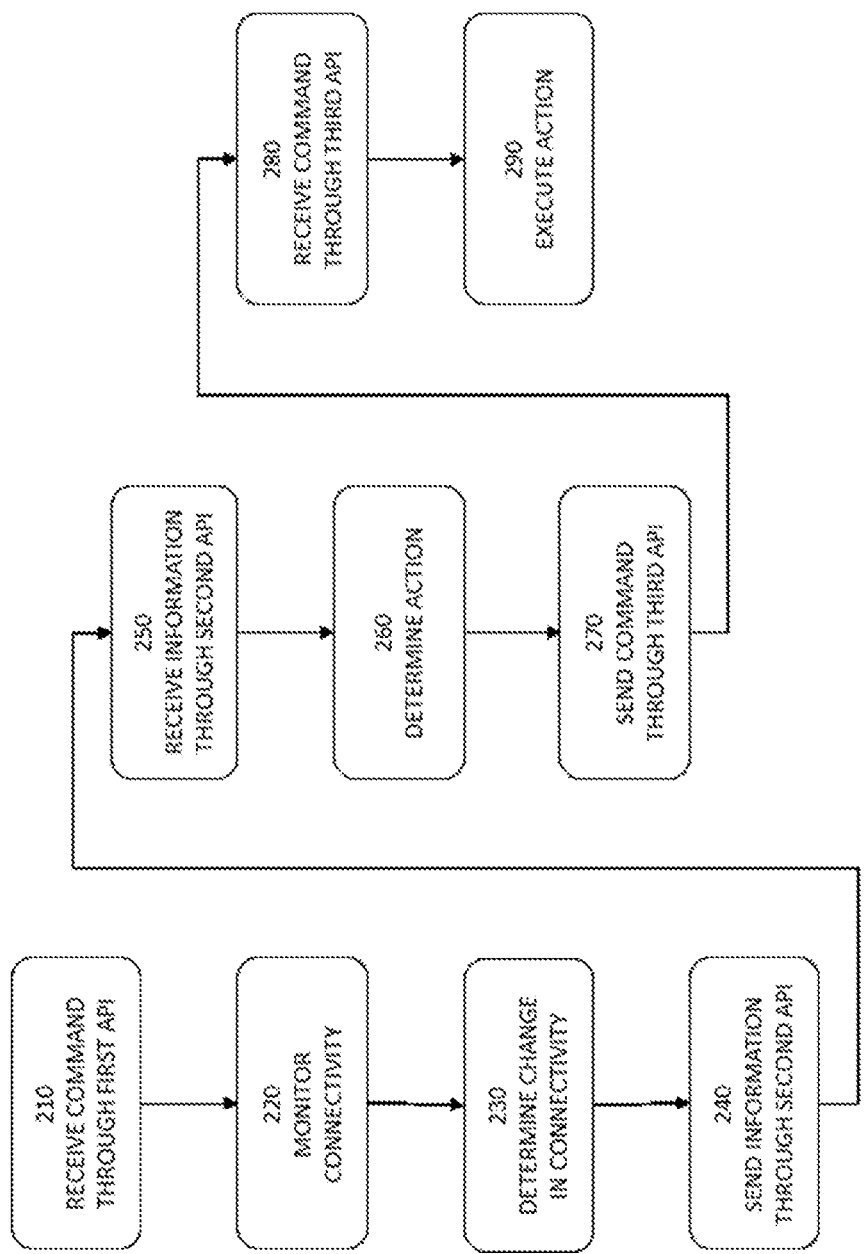
FIG. 6 is a flowchart showing a method for handling a critical application system according to one embodiment of the teachings herein.

FIG. 6 shows a flowchart for a general method according to the teachings herein for operating a critical application system 100 as in FIG. 1. In other words, the flowchart of FIG. 6 shows a method of performing a critical application 101. A critical application is an application which is associated with certain critical constraints such as time constraints or communication constraints, meaning that certain actions or functionalities of the critical application need to be done within specific time periods or within specific handshake protocols, or the application will fail critically.

The method is initiated by the software module (agent) 130 (being associated with the critical application 101) being loaded into the network device 140. This is not shown in the flowchart of FIG. 6, but is apparent in the system view of FIG. 1, and this step is assumed to launch the actual method.

The method is thus initiated by the network device 140 being configured to receive the software module 130 from the critical application system 100 and to execute the software module 130, whereby the method is started and comprises the software module 130 receiving (step 210) a command from the at least one wireless device 110 through a first application protocol interface 115. The software module 130 will then monitor (step 220) the connection to the at least one wireless device 110 and determine (step 230) whether a change in connectivity through the connection occurs. If so is determined, the software module 130 will send (step 240) information regarding the change in connectivity to the application device 120 through a second application protocol interface 125. The method (i.e. the critical application 101) will then continue with the application device 120 receiving (step 250) information regarding a change in connectivity to at least one of the at least one wireless device 110A, 110B through the second application protocol interface (125), and in response thereto determine (step 260) an action to take. As an action has been determined, the method continues with the application device 120 sending a command (step 270) associated with the action to at least one of the at least one wireless device 110A, 110B through a third application protocol interface 135.

The method (i.e. the critical application 101) will then continue with the at least one wireless device 110 receiving the command (step 280) and executing (step 290) the associated action.

In one embodiment the connection between the at least one wireless device 110 and the network 150 is a wireless multiple beam connection. In one such embodiment the change in connectivity includes a change in the number of beam connections in the wireless connection, loss of connectivity, reduced redundancy in the connection and/or change in bandwidth.

In one embodiment the application device 120 is configured to, upon receiving information on the change in connectivity; determine that the other of the at least one wireless device, i.e. the second UE 110B, should take action, and sending information to the second UE 110B accordingly, causing the second UE 110B to perform the action; determine that a failsafe operation should be initiated, and sending information to the second UE 110B accordingly, causing the second UE 110B to initiate such failsafe operation; determine that critical data residing in the first UE 110A experiencing the change in connectivity should be moved, and sending information to first UE 110A accordingly, causing the first UE 110A to move such data; and/or determine that a change of connection should be performed, and sending information to the first UE 110A accordingly, causing the first UE 110A to change the connection.

In one embodiment, the computer-readable instructions 131 of the software module 130 comprises computer-readable instructions that when loaded into and executed by a controller of the network device, causes the controller to monitor the connectivity by receiving information regarding the connection from network controllers.

As has been discussed above, the agent, i.e. the software module 130 (comprising computer-readable instructions 131 being associated with the critical application 101), is arranged to be loaded into and executed by the network device 140 thereby enabling the network device 140 to receive a command (step 210 in FIG. 6) from the UE 110 through a first application protocol interface 115 and to monitor (step 220 in FIG. 6) the connection to the UE 110. The agent 130 is further arranged to determine (step 230 in FIG. 6) whether a change in connectivity through the connection occurs, and if so, send information (step 240 in FIG. 6) regarding the change in connectivity to the application device 120 through a second application protocol interface 125. The application device (120) will thereby be prompted and caused to: determine an action to take (step 260 in FIG. 6) and send a command (step 270 in FIG. 6) associated with the action to the UE 110 through a third application protocol interface 135. The UE 110 is thereby prompted and caused to execute the associated action (step 290 in FIG. 6).

Exemplary Critical Applications

Below, different examples of critical applications 101 and how they may be implemented based on the teachings of the present invention will be disclosed. A first critical application relating to performing failsafe shutdowns of a power plant will be discussed with reference to FIG. 1.

The critical application 101 is to be used in an unmanned power plant that serves electricity to a suburb, i.e. a collection of houses. The power plant operates a system where demand and voltage across the network of electrical wiring is closely monitored in real time. For some reason, one section of the network (UE 110) is experiencing a loss of communications.

The applications in the control machinery (ND 140) of the power plant or the sensors (UE 110) have not yet noticed the outage. But the 5G system (network 150) is monitoring (through the agent 130) the reachability of the sensors at the radio level, and the radio modem and the 5G network is configured to determine that it should have heard back from the sensors (UE 110), but cannot receive any messages from them. The sensors know they are out of reach, but they cannot communicate this fact to anyone. Application level timers will fire one second from the start of the incident, but the 5G network fires a trigger about lack of two-way communication 50 ms into the incident, and as a result, communicates the issue to the power plant controller application (AD 120).

The application promptly shuts down the power plant (determines and sends action to the UE 110 who performs the action), as accurate estimation of demand and voltage would be needed for safe operation of the system. A technician is dispatches to investigate, and within an hour the problem has been found and fixed.

In their next meeting, the city council decides that additional sensor installations will be made to reduce the likelihood of shutdowns, allowing better algorithms with fault tolerance to be applied instead.

A second critical application is an application to provide a failsafe operation of self-driving cars in the face of degraded functionality.

A number of self-driving cars (UE110) are driving through an intersection in the 2032 Christmas traffic. For optimal capacity and speed through the intersection, the cars need to communicate their exact position and intents to each other and/or to a cloud-based controller system (AD 120).

Now one of the cars approaching the intersection cannot establish an efficient, low-delay communications link. Perhaps this is due to equipment breakage such as antenna being twisted or broken, perhaps due to network traffic congestion, or perhaps due to the car not being equipped for such an efficient communication (or perhaps it is still driven by a human driver).

In any case, action is needed. The controller in the network is given information about the capabilities of all approaching cars. The agent (130) in the 5G network handling the communications informs the controller (AD 120) also about the state of the communications with the cars (UE 110), because the cars have authorised and asked the network to do so (by uploading the agent 130).

The controller decides that the traffic flow needs to be throttled a bit (determined action, step 260), and signals the cars to slow down, gradually (sending commands, step 270). The self-driving cars take immediate notice and automatically adjust (execute action step 290). The car with limited communications links may not get the information about the slow-down, but can sense the other traffic around it in other ways. If the human driver is in the intersection, he also sees the traffic slowing down and breaks too, cursing the traffic jams on the highways and 5G networks.

In the end, with the help of traffic slowing down a bit through the intersection, all cars can pass through the intersection safely. A high speed, interleaving passthrough from several directions is only possible when all cars are self-driving and have perfectly operational communications channels.

This is an example of when a first UE 110A is experiencing connectivity problems, which is noticed by the agent 130 and the application device 120 informs the second UE 110B to slow down, thereby preventing an accident to occur.

Another critical application is an application to provide a failsafe operation of traffic lights in the face of degraded connectivity.

A set of traffic lights (UE 110) are connected to the city traffic control systems (AD 120) over wireless 5G networks (Network 150). The traffic control system provides some synchronization of the lights for "green wave" type arrangements throughout the city, but also provides an ability to monitor the correct operation of the traffic lights. Traffic cameras installed in the traffic light poles are also using the uplink to relay visual imagery to the control center, for both automatic AI-based alerts and human-based monitoring. At a given intersection, there are typically at least 4 traffic light poles. They are connected to each other using either physical cables, or more recently, with a local wireless network. But the connection to the city-wide controller is via 5G modems, installed on each light pole separately.

One day, for some reason, the equipment in one of the light poles is starting to fail. The light pole with the failure does not yet recognise this; some intermittent communication is still possible. However, the 5G network can sense (through the agent 130) the power levels needed for communication, and the different radio beams that reach the light pole, and determines that, according to the measurements, the ability to communicate with this light pole is marginal (step 230).

The 5G system has been instructed to let the city controller system know about these kinds of problems (step 240). The controller informs (step 270) the group of light poles of the situation, and the light poles in that intersection reconfigure (step 290) their networking to use communications links from the other light poles to send the traffic that was previously coming from the failing light pole.

Later that week a maintenance person is dispatches to take a look what is causing the problem. It turns out that a leaking seal caused ice to accumulate around the modem and its antenna, limiting communications. The equipment is fixed and communications return to normal.

This is an example of how a problem with one UE 110 may be detected and handled through the other UEs 110 reconfiguring their connections.

Figure 7:
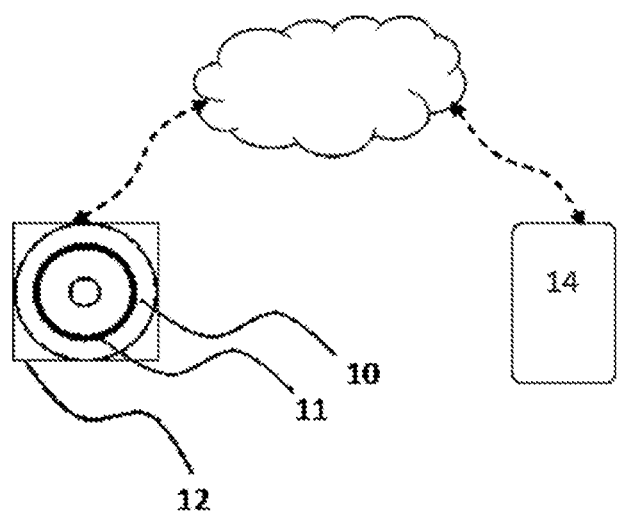
FIG. 7 shows a schematic view of a computer-readable medium according to one embodiment of the teachings herein.

FIG. 7 shows a schematic view of a computer-readable medium as described in the above. The computer-readable medium 10 is in this embodiment a data disc 10. In one embodiment the data disc 10 is a magnetic data storage disc. The data disc 10 is configured to carry instructions 11 that when loaded into a processor arrangement 110, such as a processor such as the controller of the wireless device 110 of FIG. 2, the controller of the application device 120 of FIG. 3 or the controller of the network device 140 of FIG. 5, execute a method or procedure according to the embodiments disclosed above. In one embodiment, the computer-readable medium is arranged to carry the software module 130 of FIG. 4. The data disc 10 is arranged to be connected to or within and read by a reading device 12, for loading the instructions into the processor arrangement 110. One such example of a reading device 12 in combination with one (or several) data disc(s) 10 is a hard drive. It should be noted that the computer-readable medium can also be other mediums such as compact discs, digital video discs, flash memories or other memory technologies commonly used. In such an embodiment the data disc 10 is one type of a tangible computer-readable medium 10. The instructions 11 may also be downloaded to a computer data reading device 14, such as the processor arrangement of the device 14 or other device capable of reading computer coded data on a computer-readable medium, by comprising the instructions 11 in a computer-readable signal which is transmitted via a wireless (or wired) interface (for example via the Internet) to the computer data reading device 14 for loading the instructions 11 into a processor arrangement 110. In such an embodiment the computer-readable signal is one type of a non-tangible computer-readable medium 10. The instructions may be stored in a memory (not shown explicitly in FIG. 7, but referenced 112 in FIG. 2, referenced 122 in FIG. 3 and referenced 142 in FIG. 5) of the computer data reading device 14. The instructions comprising the teachings according to the present invention may thus be downloaded or otherwise loaded in to a device 14 in order to cause the device 14 to operate according to the teachings of the present invention.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Although the present invention has been described above with reference to specific embodiments, it is not intended to be limited to the specific form set forth herein. Rather, the invention is limited only by the accompanying claims and, other embodiments than specified above are equally possible within the scope of the appended claims. In the claims, the term "comprise/comprises" does not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Reference signs in the claims are provided merely as a clarifying example and should not be construed as limiting the scope of the claims in any way.

The invention claimed is:

1. A critical application system comprising at least one wireless device comprising a first controller, a first memory and a first communication interface and an application device comprising a second controller, a second memory and a second communication interface, the at least one wireless device and the application device being configured to execute a critical application utilizing a connection to a communication network, the critical application system further comprising a software module comprising computer-readable instructions being associated with the critical application, and wherein the communication network comprises a network device, the network device comprising a third controller and a third memory, the network device being configured to receive the software module from the critical application system and to execute the software module and thereby being configured to:
receive a command from the at least one wireless device through a first application protocol interface;
monitor the connection to the at least one wireless device;
determine whether a change in connectivity through the connection occurs, and if so,
send information regarding the change in the connectivity to the application device through a second application protocol interface, wherein the second controller of the application device is configured to:
receive information regarding the change in the connectivity to at least one of the at least one wireless device through the second application protocol interface, and in response thereto
determine an action to take; and
send a command associated with the action to at least one of the at least one wireless device through a third application protocol interface,
wherein the first controller of the at least one wireless device is configured to:
receive the command associated with the action; and
execute the action.

2. The critical application system according to claim 1, wherein at least one of the first application protocol interface and the second application protocol interface is implemented as a web application interface.

3. The critical application system according to claim 1, wherein at least one of the first application protocol interface and the second application protocol interface is implemented as a non-access stratum protocol.

4. The critical application system according to claim 1, wherein the computer-readable instructions of the software module comprises
computer-readable instructions that when loaded into and executed by a controller, causes the controller to execute the software module as a standalone device having an Internet Protocol address.

5. The critical application system according to claim 1, wherein the computer-readable instructions of the software module comprises computer-readable instructions that when loaded into and executed by a controller, causes the controller to monitor the connectivity by receiving information regarding the connection being monitored from network controllers.

6. The critical application system according to claim 1, wherein the connection between the at least one wireless device and the communication network is a wireless multiple beam connection.

7. The critical application system according to claim 6, wherein the change in the connectivity includes a change in a number of beam connections in the wireless multiple beam connection, loss of connectivity, reduced redundancy in the wireless multiple beam connection and/or a change in bandwidth.

8. The critical application system according to claim 1, wherein the network device is a network server.

9. The critical application system according to claim 1, wherein the network device is a base station.

10. The critical application system according to claim 1, wherein the first application protocol interface comprises at least one instruction of an instruction set comprising {start tracking a wireless device's connectivity, stop tracking a wireless device's connectivity}.

11. The critical application system according to claim 1, wherein the application device is configured to, upon receiving the information on the change in the connectivity:
determine that an other of the at least one wireless device should take action, and sending information regarding the action to the other of the at least one wireless device accordingly, causing the other of the at least one wireless device to perform such action;
determine that a failsafe operation should be initiated, and sending information of the failsafe operation to the other of the at least one wireless device accordingly, causing the other of the at least one wireless device to initiate such failsafe operation;
determine that critical data residing in the at least one wireless device experiencing the change in the connectivity should be moved, and sending information regarding the critical data to the at least one wireless device accordingly, causing the at least one wireless device to move such data; and/or
determine that a change of connection should be performed, and sending information regarding the change of the connection to the at least one wireless device accordingly, causing the at least one wireless device to change the connection.

12. A method for operating a critical application system comprising at least one wireless device and an application device, the at least one wireless device and the application device executing a critical application utilizing a connection to a communication network,
the critical application system further comprising a software module being associated with the critical application, and wherein the communication network comprises a network device, the method comprising in the network device receiving the software module from the critical application system and executing the software module, thereby:
receiving a command from the at least one wireless device through a first application protocol interface;
monitoring the connection to the at least one wireless device;
determining whether a change in connectivity through the connection occurs, and if so,
sending information regarding the change in the connectivity to the application device through a second application protocol interface, wherein the method further comprises in the application device:
receiving information regarding the change in the connectivity to at least one of the at least one wireless device through the second application protocol interface, and in response thereto
determining an action to take; and
sending a command associated with the action to at least one of the at least one wireless device through a third application protocol interface,
wherein the method further comprises in the at least one wireless device:
receiving the command associated with the action; and
executing the action.

13. An application device arranged to be used in a critical application system comprising at least one wireless device and said application device, the application device being configured to execute a critical application utilizing a connection to a communication network, the application device comprising a controller, a memory and a communication interface, the controller being configured to
receive information regarding a change in connectivity to at least one of the at least one wireless device through a second application protocol interface from a software module comprising computer-readable instructions being associated with the critical application, and in response thereto determine an action to take; and send a command associated with the action to at least one of the at least one wireless device through a third application protocol interface, prompting the at least one of the at least one wireless device to execute the action.

14. A method for use in at least one wireless device being arranged to be used in a critical application system comprising the at least one wireless device and at least one application device, the at least one wireless device and the at least one application device being configured to execute a critical application utilizing a connection to a communication network, the critical application system further comprising a software module comprising computer-readable instructions being associated with the critical application, and wherein the communication network comprises a network device being configured to receive and execute the software module, the method comprising:

sending a command to the software module through a first application protocol interface; prompting the software module to monitor the connection to the at least one wireless device;

determine whether a change in connectivity through the connection occurs, and if so, send information regarding the change in the connectivity to the at least one application device through a second application protocol interface, thereby prompting a controller of the at least one application device to:

determine an action to take; and send a command associated with the action to at least one wireless device through a third application protocol interface, wherein the method comprises:

receiving the command associated with the action and executing the action.

\* \* \* \* \*